United States Patent

Hays

[11] 4,162,670
[45] Jul. 31, 1979

[54] FOOD WARMER ASSEMBLY FOR USE WITH A VEHICLE ENGINE

[76] Inventor: Victor Hays, Eagle Creek, British Columbia, Canada

[21] Appl. No.: 847,239

[22] Filed: Oct. 31, 1977

[51] Int. Cl.$^2$ .............................................. B60H 1/04
[52] U.S. Cl. ................................. 126/19.5; 237/12.3 B
[58] Field of Search .................... 126/19.5; 237/12.3 B

[56] References Cited

U.S. PATENT DOCUMENTS

| | | | |
|---|---|---|---|
| 2,756,031 | 7/1956 | Sanstrom | 126/19.5 X |
| 3,013,548 | 12/1961 | Thomas | 126/19.5 |
| 3,809,059 | 5/1974 | Burk et al. | 126/19.5 |
| 3,874,361 | 4/1975 | Parrinello | 126/19.5 |

Primary Examiner—Edward G. Favors

[57] ABSTRACT

A food warmer assembly for use with a vehicle engine, the assembly comprising a chest having a compartment therein and including a removable top, retainers disposed in the compartment for support of food stuffs, a supply conduit extending through a wall of the chest, a heating conduit disposed in the compartment and connected to the supply conduit, a return conduit extending through a wall of the chest, the return conduit being connected to the heating conduit, the supply and return conduits having at their ends respectively couplings adapted for connection to corresponding couplings in communication with a source of coolant for the vehicle engine.

8 Claims, 2 Drawing Figures

FOOD WARMER ASSEMBLY FOR USE WITH A VEHICLE ENGINE

BACKGROUND OF THE INVENTION

1. FIELD OF THE INVENTION

The invention relates to devices for maintaining food stuffs warm while in transit, and is directed more particularly to a food warmer assembly for use in conjunction with a vehicle engine cooling system.

2. DESCRIPTION OF THE PRIOR ART

There have been developed several vehicle associated devices to maintain food stuffs warm while in transit. Examples of such devices may be found in U.S. Pat. Nos. 1,458,412, issued June 12, 1923, to E. C. Hixson et al; 1,598,736, issued Sept. 7, 1926, to C. N. McDonald; 3,013,548, issued Dec. 19, 1961, to A. C. Thomas; 3,590,802, issued July 6, 1971, to J. Fried; 3,809,059, issued May 7, 1974, to R. L. Burk et al; and 3,874,361, issued Apr. 1, 1975, to J. Parrinello, and in the several patents referred to and briefly described in the Parrinello patent.

In spite of the above advances, there still exists a need for an inexpensive and convenient food warmer assembly for use in vehicles in transit.

SUMMARY OF THE INVENTION

It is therefore an object of the present invention to provide a food warmer assembly for use with a vehicle engine, the assembly being relatively non-complex and convenient to use.

A further object of the invention is to provide such an assembly as will receive its heat input from the vehicle engine cooling system.

A still further object of the invention is to provide such an assembly as may be readily connected and disconnected from the heating source.

With the above and other objects in view, as will hereinafter appear, a feature of the present invention is the provision of a food warmer assembly for use with a vehicle engine, the assembly comprising a chest having a compartment therein and including a removable top means, retaining means disposed in the compartment for support of food stuffs, a supply conduit extending through a wall of the chest, a heating conduit disposed in the compartment and connected to the supply conduit, a return conduit extending through a wall of the chest, the return conduit being connected to the heating conduit, the supply and return conduits having at their ends repectively a supply coupling first portion and a return coupling first portion adapted for connection respectively to a supply coupling second portion and a return coupling second portion, the coupling second portions being in communication with a source of coolant for the engine.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which is shown an illustrative embodiment of the invention from which its novel features and advantages will be apparent.

DESCRIPTION OF THE PREFERRED EMBODIMENT

Figure 1:
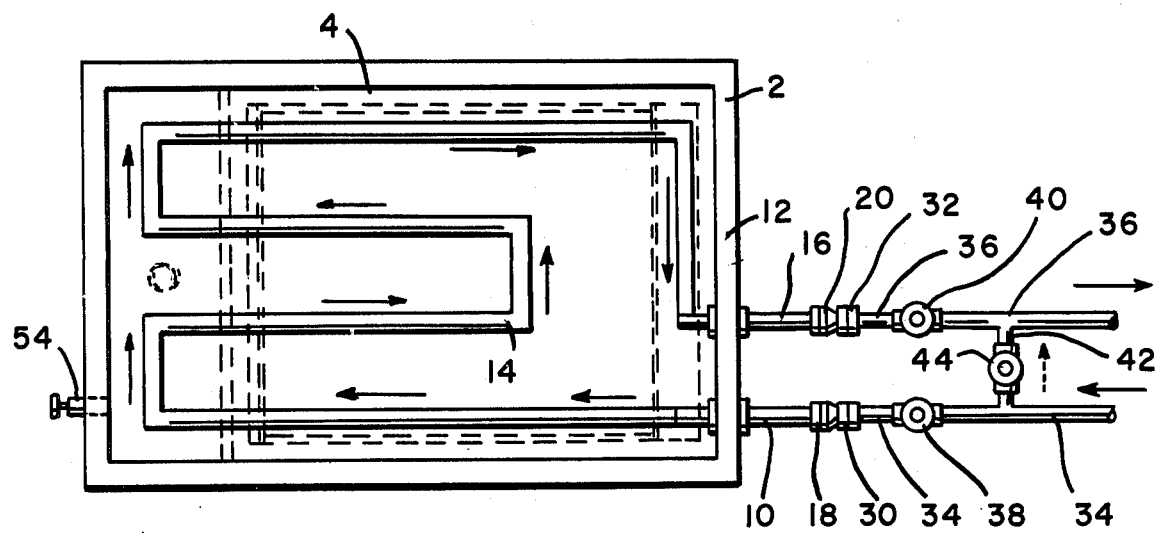
FIG. 1 is a plan view of an illustrative embodiment of the invention.

Referring to the drawings, it will be seen that the illustrative embodiment includes a chest 2 having a compartment 4 therein. A removable top 6 is provided for enclosure of the compartment 4 and for access to the compartment. Retaining means 8 are disposed in the compartment for support of various food stuffs.

A first supply conduit 10 extends through a wall 12 of the chest 2. A heating conduit 14 is disposed in the compartment 4 and is connected to the first supply conduit 10. The heating conduit 14 winds through a lower portion of the compartment 4 and is connected to a first return conduit 16 extending through the wall 12. The first supply conduit 10 and the first return conduit 16 have at their ends respectively a supply coupling first portion 18 and a return coupling first portion 20 adapted for connection respectively to a supply coupling second portion 30 and a return coupling second portion 32. The coupling second portions 30, 32 are in communication with a source of coolant for the engine of the vehicle, as will be further described below.

The supply coupling second portion 30 is connected to a second supply conduit 34 connected to the source for engine coolant and the return coupling second portion 32 is connected to a second return conduit 36 which is in communication with the source for engine coolant.

A supply valve 38 is disposed in the second supply conduit 34 proximate the supply coupling second portion 30 and a return valve 40 is disposed in the second return conduit 36 proximate the return coupling second portion 32.

A bypass conduit 42 extends from the second supply conduit 34 to the second return conduit 36 and has disposed therein a bypass valve 44. The bypass conduit 42 is disposed between the engine coolant source and the supply and return valves 38, 40.

The supply and return coupling first portions 18, 20 and the supply and return coupling second portions 30, 32 are of the quick connect-disconnect type. Thus, the chest 2 may be quickly connected to the conduits 34, 36, the valves 38, 40 opened and the valve 44 closed to have the heating conduit 14 placed in the circuit of flow for the engine cooling medium.

Figure 2:
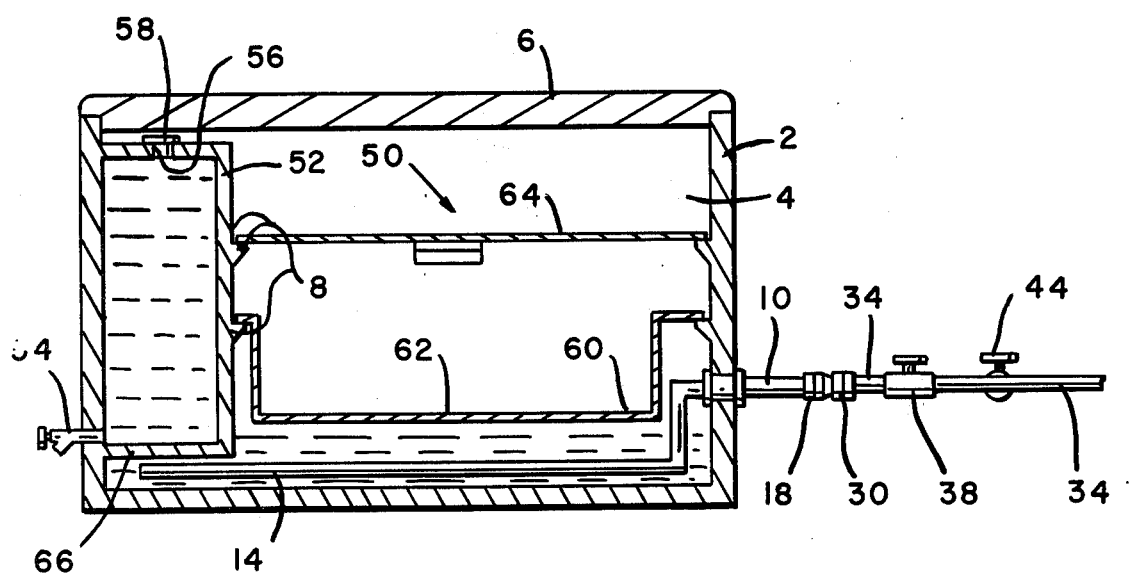
FIG. 2 is a side sectional view of the assembly shown in FIG. 1.

Referring to FIG. 2, the retaining means 8 may comprise shelving 50 and preferably includes an enclosed reservoir 52 for liquids. The reservoir 52 is provided with an outwardly extending spigot 54 to permit the liquid therein to be drained from the reservoir. The reservoir is further provided with an upper opening 56 and fill plug 58 for purposes of filling the reservoir.

Preferably, the shelving 50 includes a first shelf 60 having a retaining surface 62 proximate the heating conduit 14, and a second shelf 64 disposed in a plane parallel to the surface 62 but more distant from the heating conduit than the surface 62.

A bottom wall 66 of the reservoir 52 is disposed proximate a portion of the conduit 14 so that the liquid in the reservoir will be readily heated by the heating conduit.

The chest 2 is adapted to retain a free fluid, such as water, in the bottom portion thereof, the heating conduit 14 being beneath the level of the fluid. In its preferred usage, the bottom wall 66 of the reservoir 52 is disposed beneath the level of the fluid and the first shelf surface 62 is disposed above the level of the fluid.

In use, an operator need only connect the couplings 18, 20 to the couplings 30, 32, open the valves 38, 40 and close the valve 44. The heating conduit 14 is then in communication with the engine coolant, the coolant entering the compartment 4 by way of the first supply conduit 10. The engine cooling fluid then circulates through the compartment, its heat being dissipated to the fluid in the bottom of the compartment which in turn heats the liquid in the reservoir 52 and warms the food stuffs on the shelves 60, 64. When use of the assembly is no longer desired, the valves 38 and 40 are closed and the valve 44 is opened, thereby removing the assembly from the circuit of flow of the engine coolant fluid. If it is desired to remove the chest from the vehicle, the chest need only be moved outwardly from the couplings 30, 32 to disconnect the couplings 18, 20 therefrom and remove the chest from the vehicle.

It is to be understood that the present invention is by no means limited to the particular construction herein disclosed and/or shown in the drawings, but also comprises any modifications or equivalents within the scope of the disclosure.

Having thus described my invention what I claim as new and desire to secure by Letters Patent of the United States is:

1. A food warmer assembly for use with a vehicle engine, said assembly comprising a chest having a compartment therein and including a removable top means, retaining means disposed in said compartment for support of foodstuffs, a first supply conduit extending through a wall of said chest, a heating conduit disposed in said compartment and connected to said first supply conduit, a first return conduit extending through a wall of said chest, said first return conduit being connected to said heating conduit, said first supply and return conduits having at their ends respectively a supply coupling first portion and a return coupling first portion adapted for connection respectively to a supply coupling second portion and a return coupling second portion, a second supply conduit having a first end connected to a source for engine coolant and a second end having said supply coupling second portion thereon, a second return conduit having a first end connected to said source for engine coolant and a second end having said return coupling second portion thereon, a supply valve disposed in said second supply conduit proximate said supply coupling second portion and a return valve disposed in said second return conduit proximate said return coupling second portion, a bypass conduit extending from said second supply conduit to said second return conduit, and a bypass valve disposed in said bypass conduit, said bypass conduit being disposed between said source and said supply and return valves.

2. The invention according to claim 1 in which said supply and return coupling first portions and said supply and return coupling second portions are of a quick connect-disconnect type.

3. The invention according to claim 1 in which said retaining means includes an enclosed reservoir for liquids.

4. The invention according to claim 3 including a spigot disposed on a wall of said chest and in communication with said reservoir.

5. The invention according to claim 1 in which said retaining means includes first shelf means having a surface proximate said heating conduit, and second shelf means diposed in a plane more distant from said heating conduit than the plane of said first shelf means.

6. The invention according to claim 4 in which a bottom wall of said reservoir is disposed proximate to said heating conduit.

7. The invention according to claim 5 in which said compartment is adapted to retain a free fluid in the bottom portion thereof, said heating conduit being substantially beneath the level of said fluid, and said first shelf means being disposed above the level of said fluid.

8. The invention according to claim 6 in which said compartment is adapted to retain a free fluid in the bottom portion thereof, said heating conduit being substantially beneath the level of said fluid, and said bottom wall of said reservoir being disposed beneath the level of said fluid.

* * * * *